United States Patent [19]

Jaffe

[11] Patent Number: 4,539,767
[45] Date of Patent: Sep. 10, 1985

[54] DEVICE FOR THE MARKING OF ELECTRICAL WIRES AND CABLES, PIPES

[76] Inventor: Walter Jaffe, Pl. 6530 Skaven, S-531 00 Lidkoping, Sweden

[21] Appl. No.: 447,986

[22] Filed: Dec. 8, 1982

Related U.S. Application Data

[63] Continuation-in-part of Ser. No. 345,358, Feb. 3, 1982, abandoned.

[30] Foreign Application Priority Data

Jun. 23, 1981 [SE] Sweden ............................ 8103918

[51] Int. Cl.³ .............................................. G09F 3/00
[52] U.S. Cl. ..................... 40/316; 40/2 R; 40/10 R
[58] Field of Search ............... 40/2 R, 316, 21 R, 539, 40/21 A, 19, 21 B, 21 C, 10 R; 46/1 L, 11

[56] References Cited

U.S. PATENT DOCUMENTS

| 1,563,371 | 12/1925 | Jones | 40/316 |
|---|---|---|---|
| 1,824,199 | 9/1931 | Donohoe | 40/21 R |
| 1,832,318 | 11/1931 | Myers | 40/21 R |
| 2,177,359 | 10/1939 | Baker | 40/21 R |
| 2,235,870 | 3/1941 | Dedmon | 40/19 |
| 2,248,145 | 7/1941 | Wilder | 40/21 R |
| 2,642,684 | 6/1953 | Watts | 40/10 C |
| 3,068,600 | 12/1962 | Blanchet | 40/316 |
| 3,303,603 | 2/1967 | Abeson | 46/1 L |
| 3,623,253 | 11/1971 | Hohulin | 40/21 C |
| 3,650,059 | 3/1972 | Johnson | 40/316 |
| 4,004,362 | 1/1977 | Barbieri | 40/316 |
| 4,268,986 | 5/1981 | Piana | 40/316 |

FOREIGN PATENT DOCUMENTS

| 674239 | 11/1963 | Canada | 40/316 |
|---|---|---|---|
| 673487 | 11/1963 | Canada | . |
| 873434 | 7/1942 | France | 40/316 |
| 2336755 | 7/1977 | France | 40/316 |
| 355021 | 8/1931 | United Kingdom | 40/316 |
| 965336 | 7/1967 | United Kingdom | 40/316 |

Primary Examiner—Robert P. Swiatek
Assistant Examiner—Cary E. Stone
Attorney, Agent, or Firm—Cushman, Darby & Cushman

[57] ABSTRACT

A marking device for wires, cables, tubes or the like is in the form of an oblong piece of flexible and resilient material having an intermediate portion adapted for carrying markings in the form of letters or other characters and end portions each provided with an opening and being capable of being bent at an angle to said intermediate portions for bringing said openings in substantial axial alignment for receiving the wire or the like, on which the marking is to be placed, the marking device being held in position on the wire etc. by means of friction between the wire and the material around the openings.

3 Claims, 32 Drawing Figures

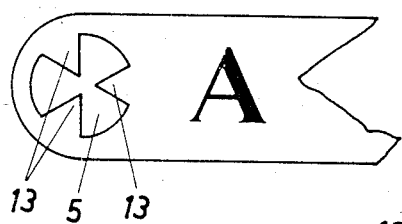
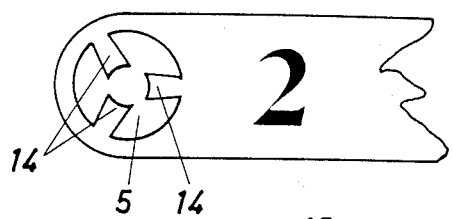
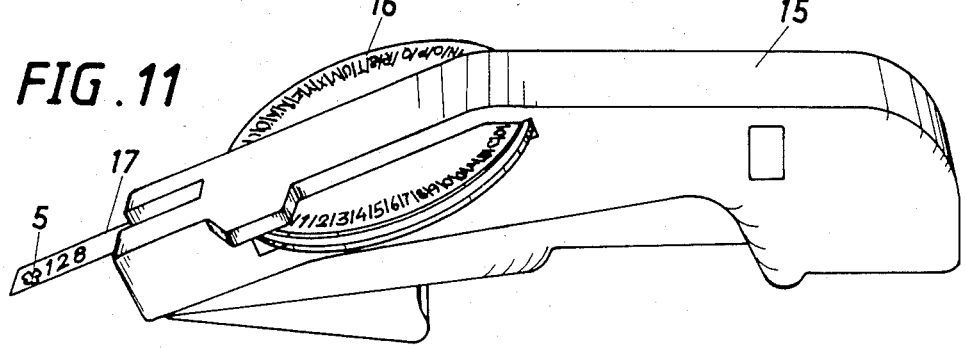
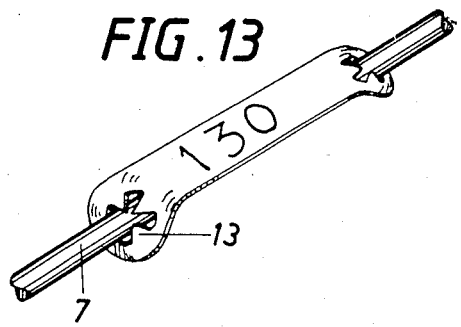
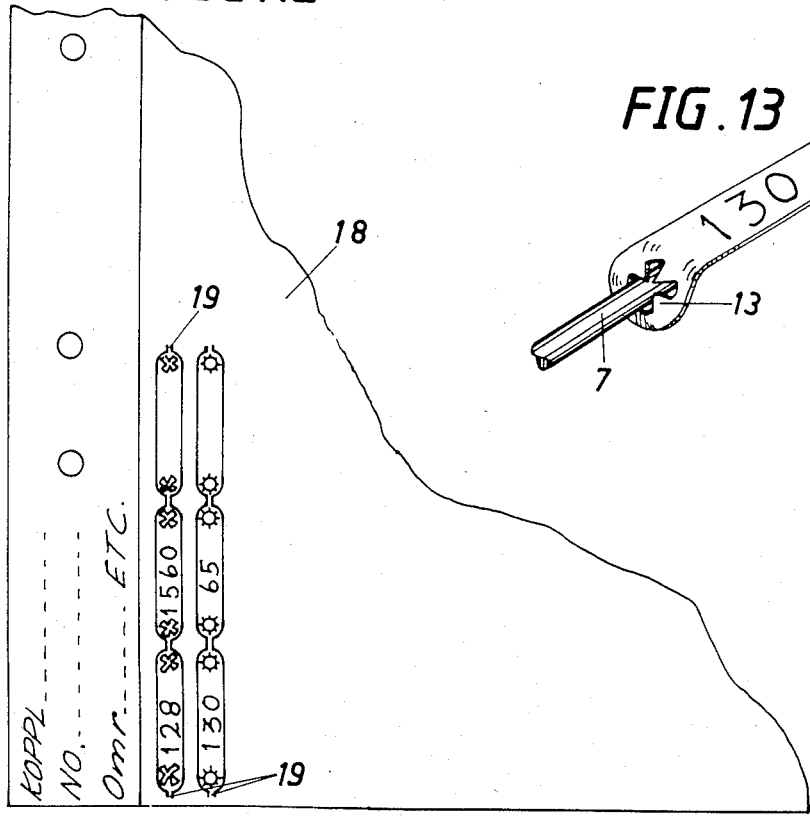

DEVICE FOR THE MARKING OF ELECTRICAL WIRES AND CABLES, PIPES

This is a continuation-in-part application of application Ser. No. 345,358 filed Feb. 3, 1982 now abandoned.

The present invention relates to devices for providing identifying markings on elongated objects, such as electrical wires and cables, tubes, pipes or the like, and comprising a flat, oblong piece of material.

According to existing regulations, the marking of electrical wires and cables as well as the marking of pipes for pressurized fluids must be made in such a way that the markings are permanent and readily legible.

A number of devices for this purpose are previously known, for instance label frames of a more or less complicated design. It is also known to use sleeve-shaped members with a printed marking, which are pushed on to a wire or the like.

Such marking of single wires is commonly effected by means of separate sleeves, which are mounted separately on the wire, which has the drawback that the separate elements of the identifying marking are capable of independently turning around and moving along the wire, which may lead to misinterpretation of the marking, for instance when individual characters become separated. This drawback may be overcome by providing all the characters of the marking on a single contiguous sleeve, but this would necessitate to keep a large assortment of marking sleeves in stock considering the variety of character combinations and the varying diameters of wires, cables and tubes. Also, the printed markings on sleeves of this type is unprotected and very often gets partly rubbed off and obscured by dirt.

Another type of known marking sleeves are adapted to have inserted into them labels or strips carrying the identifying marking. Some marking sleeves of this type have the drawback that the inserted label may fall out of the sleeve, whereas other forms of this type necessitate separate and more complicated attachment means, which makes the marking more expensive and complicated.

Another known type of device is a label holder into which a label indicating a name, an address or the like is inserted. Such marking devices are used for instance as address tags on luggage. Also in this case a special attachment means is needed for attaching the label to the object to be marked. A label holder of this general type is shown in the 1944 British patent specification No. 565,750.

The object of the present invention is to provide a very simple marking device, which is cheap in manufacture and may very easily be applied to the object which is to be marked. In comparison with known devices, the novel device shall be capable of being very securely attached to the object and shall be well protected against mechanical abrasion and fouling. Another object of the invention is to prevent that the individual elements of the marking are separated, turned around or get lost. As concerns the attachment means, the marking device is to be so designed that, in comparison with the previously known marking sleeves, a considerably reduced number of sizes are necessary for covering a large range of diameters of the wires, cables or tubes. Thus, the users need only stock a small number of different sizes.

The marking device according to the invention will be more closely described here below with reference to the accompanying drawings, which show some embodiments of the invention.

FIG. 1 is a view in perspective of a marking device according to the invention,

FIG. 2 illustrates a marking element with a suitable indication by means of a combination of letters, numbers or other characters, preferably in the form of a strip having weak end portions between individual characters for permitting individual characters to be broken off and inserted into the marking device according to FIG. 1, FIG. 3 shows the marking device with the marking element inserted therein before mounting on the object, FIG. 4 shows the marking device with marking elements inserted therein and with the perforated end portions of the marking device turned down, FIG. 5 shows the complete marking device threaded on to a single insulated wire, FIG. 6 illustrates a further embodiment of the invention, FIG. 7 is a perspective view of a modified embodiment of the marking device, wherein the character combination is written or printed directly on the middle portion of the marking device, FIG. 8 shows a marking device according to FIG. 7 ready for being mounted on a wire, FIG. 9 is a view to an enlarged scale of one end portion of a marking device with a different shape of the opening for the wire, FIG. 10 is a view corresponding to FIG. 9 showing still another shape of the wire opening, FIG. 11 is a view in perspective of a tool for producing marking devices according to the invention from a continuous strip of material, FIG. 12 shows a portion of a sheet material wherein marking devices according to the invention are printed and partially punched out, FIG. 13 is a view in perspective of a marking device of the type generally illustrated in FIG. 10 placed in position on a wire, FIG. 14 is a perspective view of a preferred embodiment of the marking device of the present invention, FIG. 15 is a view of the marking device of FIG. 14 inserted on a wire, FIG. 16 is a perspective view of another embodiment of the marking device of the present invention, FIG. 17 is a side view in elevation of the marking device of FIG. 16 mounted on a wire, FIG. 18 is a top plan view of a sheet material carrying a plurality of marking devices of FIG. 14 thereon, FIG. 19 is a perspective view of a marking device of FIG. 14 mounted on a wire so as to be movable therealong, FIG. 20 is a view of the marking device of FIG. 19 disposed on a wire with the ends bent to lock the marking device in place, FIGS. 21A, 21B, 21C and 21D are figures illustrating the method of removing a marking device of FIG. 14 from a piece of sheet material and inserting and locking the marking device on a section of wire, FIG. 22A is a perspective view of a marking device of a transparent material and a holder for a marking element, FIG. 22B shows a position where the holder has been introduced under the marking device, FIG. 22C shows a marking element positioned in the holder and visible through the marking device, FIG. 23 is a plan view of a marking device with a holder for a marking element as an integral unit, FIG. 24 is a section according to the line XXIV—XXIV in FIG. 23, FIG. 25 is a corresponding section but with the holder folded to active position, FIG. 26 is a plan view of a marking element and a further embodiment of a holder for a marking element, and FIG. 27 is a section according to the line XXVII—XXVII in FIG. 26.

DETAILED DESCRIPTION OF THE INVENTION

Figure 1:
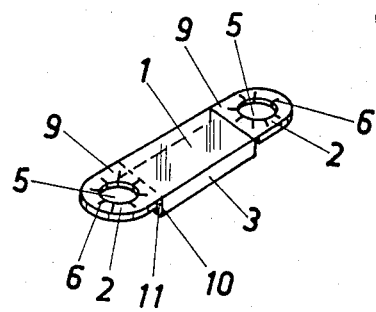

In the embodiment illustrated in FIG. 1, the marking device 1 is made of a transparent and preferably slightly resilient material, such as plastic. The device is of oblong shape and has a central portion 3 in the form of a tube of rectangular cross-section open at both ends for the insertion therein of a marking element 4 of the type illustrated in FIG. 2. At both ends, the device is provided with rounded lug portions 9 provided with openings 5 of a slightly smaller diameter than the diameter of the wires 7 (FIG. 5) or the like, which is intended to be threaded through the openings 5. In order for the marking device to be more securely attached to the wire and to allow for varying dimensions, the lugs 9 are provided with a number of radial slits 6 around the circumference of the opening 5. The portions of material between the slits 6 taper off towards the opening 5, so that between each pair of slits there is formed an elastic lip 2 providing increased friction against the wire or the like. The thickness of the material of the device is slightly reduced by means of a shallow groove 11 at the transition between the middle portion 3 and the lugs 9 to form bending lines, around which the lugs are turned down for mounting the device on a wire or the like.

Figures 2, 3:
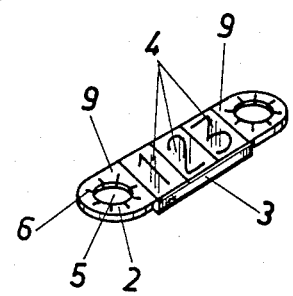

The marking element 4 shown in FIG. 2 may be in the form of a contiguous element comprising the complete combination of characters required for the intended marking, or it may be in the form of a strip containing single characters, which may be broken off and individually inserted into the portion 3 of the marking device for forming the required character combination.

FIG. 3 shows the marking device with marking elements 4 inserted therein.

Figure 4:
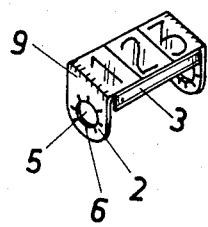

The next stage is illustrated in FIG. 4, wherein the lug portions 9 of the marking device have been bent down approximately 90° over the ends of the central portion 3. In this way the internal stress of the material is used to a certain extent for further increasing the friction between the edges of the openings 5 and the wire passing therethrough. At the same time, the bent-down lug portions 9 effectively cover the open ends of the tubular middle portion 3 of the device, thereby preventing the marking elements from falling out.

Figure 5:
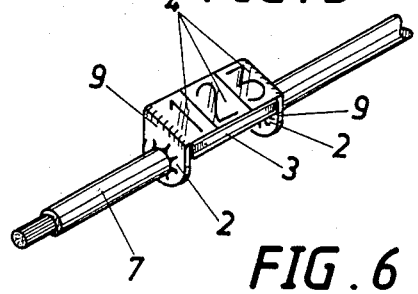

FIG. 5 illustrates the marking device attached to a single insulated electric wire 7, which has been pushed through the openings 5 in the bent-around lug portions 9 of the device, which is held by friction in this position on the wire. In the example illustrated, the marking is in the form of numbers, which are clearly visible through the transparent plastic material and which are protected thereby.

Figure 6:
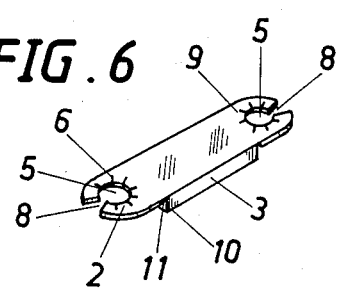

FIG. 6 illustrates another embodiment of the marking device according to the invention, wherein the lug portions 9 have been provided with an open slot between the edge of each lug and each opening 5, which makes it possible to snap the device onto wires or the like in case it is not possible to thread the device onto the wire or the like from the end thereof.

Figure 7:
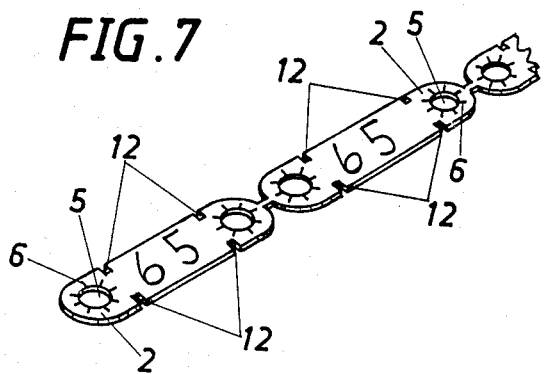
Figure 8:
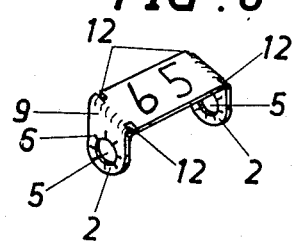

A further embodiment of the marking device is illustrated in FIG. 7. In this embodiment the marking device is made from a flat piece of material of uniform thickness and has no hollow central portion as in the previously described embodiment. Instead, the marking is written or printed directly on the middle portion of the flat marking device. Notches 12 at the side edges between the central portions and the end lugs provided weakenings for bending the lugs. The notches 12 are provided in the case where the marking devices are stamped out from a sheet of flat material. In the case of injection moulding of the devices, the bending indications may instead be obtained by means of a transverse groove, such as the groove 11 in FIG. 1.

The manufacturing of the marking device according to the embodiments so far described may be made either by injection moulding or by stamping out from a extruded material in the form of a rectangular hollow profile. The modified embodiment according to FIG. 7 may also be stamped directly from a flat, resilient PVC-material in the form of thinner sheets. In both methods of production, a narrow bridge of material may be left between each marking device. In this way the marking devices may be stored in the form of rolls, strips or sheets, so that the marking devices may be broken off as they are used, the lug portions thereafter being bent around for placing the marking device on the wire, cable or the like.

FIGS. 9 and 10 illustrate two embodiments, wherein the holes in the end portion of the device are designed to accommodate a wide range of wire, cable or the like diameters, at the same time providing sufficient friction against the wire or the like for securely retaining the marking device in position even on small diameter wires or the like. In FIG. 9 the opening 5 is formed with three substantially triangular lugs 13, equally spaced around the circumference of the opening and projecting towards the centre thereof. When the device is made of an elastic or resilient material, the resilient lugs 13 will engage the surface of the wire or the like and resist displacement of the device along the wire or turning of the device around the wire. In the embodiment shown in FIG. 10 there are also provided three lugs 14 but of a different shape. The shape of the lugs will be dependent upon the resiliency of the material to make the lugs resilient to the required degree.

FIG. 13 illustrates a marking device of a similar type as those shown in FIGS. 9 and 10 mounted on a wire 7. In FIG. 13 the openings for the wire are provided with lugs 13 of a similar shape as in FIG. 9, but there are four lugs instead of three.

For certain applications it would be possible to manufacture the marking device according to the invention from a tape of similar type as that used in embossing tools for providing embossed lettering on marking tape. Such a tool 15 is schematically illustrated in FIG. 11 and is provided with an embosssing disc 16 for producing embossed characters on a tape 17. This type of embossing tool has a built-in cutter for cutting off the required length of embossed tape. For producing marking devices according to the invention the tool would also be provided with a punching device for punching out the holes 5 at the ends of each marking device.

As illustrated in FIG. 12, the marking devices may be punched out from a sheet 18 of a suitable plastic material, leaving bridge portions 19 at the ends of a row of marking devices, so that they may be removed from the sheet by breaking through said bridges. This embodiment is of special advantage in for instance large electrical installations, since the sheet can be printed with the appropriate markings on the marking devices and with indications of to which section of the installation the markers belong. In this way the appropriate marking devices will be at hand for each phase of the installation work, and there is little risk that the marking of a single wire or cable will be omitted.

Figure 14:
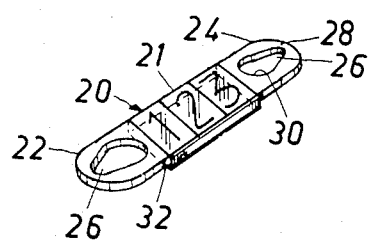
Figure 15:
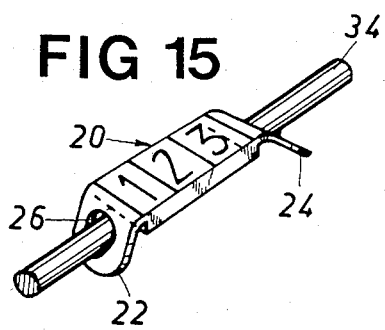

Turning now to FIG. 14, there is shown a preferred embodiment of the marking device of the present invention generally designated at 20. The device 20 may be of transparent and preferably slightly resilient material such as plastic as in the previous embodiments. More specifically, it has been found that a thin flexible plastic polyester sheet material may be employed. The device 20 includes a central portion 21 and has a tube of rectangular cross-section open at 32 at opposite ends of the body 20 as in the embodiment illustrated in FIGS. 1 and 2, described above. Thus, marking elements such as illustrated in numerals 1, 2 and 3 may be cut from a separate sheet and inserted into the rectangular tube. At both ends of the device 20 there are provided rounded lugs 22 and 24 each of which is provided with an opening 26 having a specific shape. In particular, each opening 26 is "pear"-shaped, that is, having a large diameter portion 30 adjacent the body portion 21 and which tapers down to a narrow diameter portion 28 which is remote from the body portion 21. With this arrangement, as illustrated in FIG. 15, when the lugs 22 and 24 are bent to be slipped over a wire 34, the device 20 can be easily slid along the wire to a desired location. However, when the lugs 22 and 24 are released, the sheet material, due to its inherent resiliency, will bend the lug portions 22 and 24 so that the wire will be wedged in the tapering ends 28 of the holes 26. By pressing the mid-portion of the marker against the wire, the marker will be very firmly locked to the wire. Also, with the lugs 22 and 24 bent, the marking elements will be held in the tube section.

Figure 16:
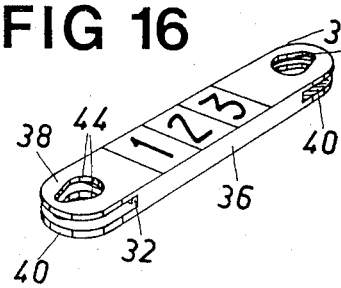
Figure 17:
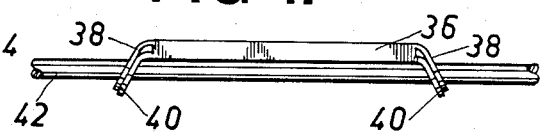

A modification of the embodiment of FIGS. 14 and 15 is illustrated in FIGS. 16 and 17. In FIG. 16, each end of the body 36 is provided with pairs of lugs 38 and 40, the surfaces of which extend in a coplanar relationship with the adjacent planar surface of the body portion 36. Each of the lugs 38 and 40 are provided with aligned "pear"-shaped opeings as in the embodiment of FIGS. 14 and 15. The indicating indicia may be inserted by sliding the indicia into the opening 32 provided at each end of the body 36 between the lugs 38 and 40. With this arrangement, as shown in FIG. 17, the indicia will be firmly locked in place since, when a wire 42 is inserted through each of the lug's openings 44, the opening 32 will be effectively closed. In addition, the marker device of the embodiment of FIGS. 16 and 17 will be securely locked in place on the wire 42 since the parallel extending lugs 38 and 40 complement each other in locking the wire in the narrow portion of the openings 44.

Figure 18:
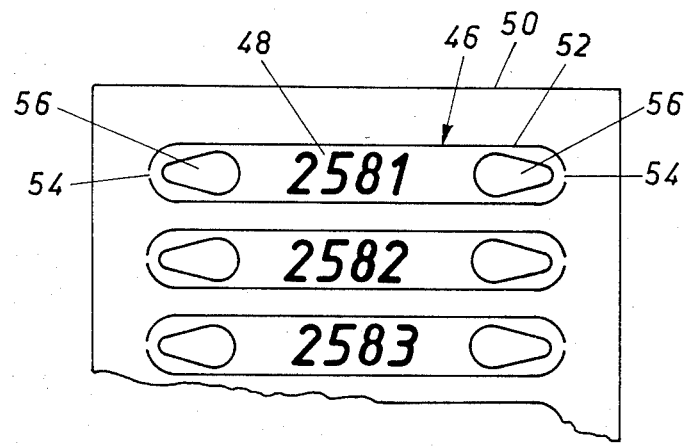
Figure 19:
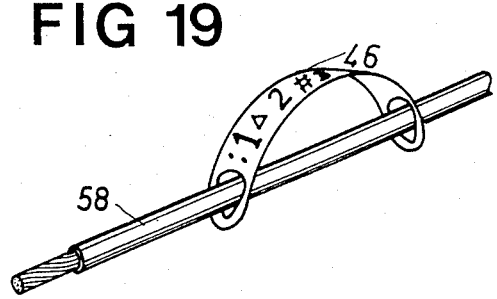
Figure 20:
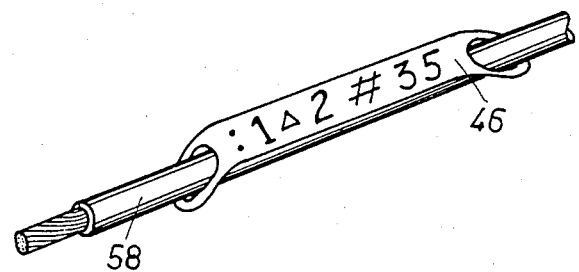

In FIGS. 18-20, another embodiment of the present invention is shown wherein the marking device 46 comprises a thin sheet of resilient plastic material such as polyester on which is directly imprinted indicia 48. The sheet 50 is scored as at 52 except for small bridges 54 at the opposite ends of the marker deice 46 which retain the maker device 46 on the sheet 50 but which are easily severed by bending to remove the marker device. As in the previous embodiments, pear-shaped apertures 56 are punched through the ends of the marker device 46.

As with the previous embodiments, the tool of FIG. 11 may be employed to provide embossed characters on the marking devices as well as form the pear-shaped holes.

Referring to FIGS. 19 and 20, the marking device 46 is shown mounted on a wire 58. In the arched position, the marker 46 can easily be moved along the wire by an individual until the desired location is achieved. Then, the body of the marker can be pushed against the wire as shown in FIG. 20 so as to bend the end lugs to bring the narrow portions of the holes 56 into locking engagement with the wire.

Figure 21A:
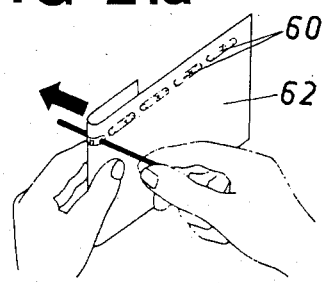
Figure 21B:
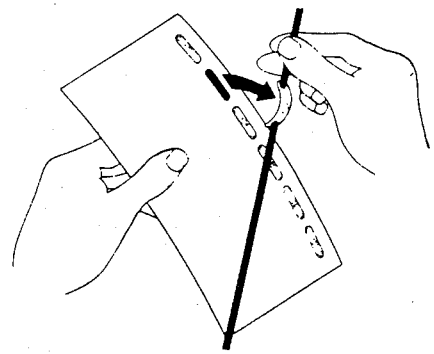
Figure 21C:
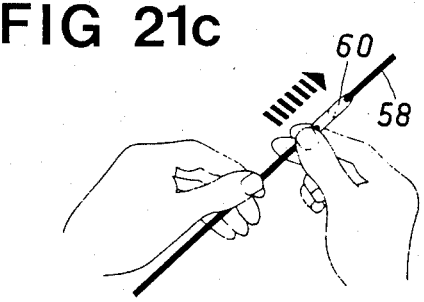
Figure 21D:
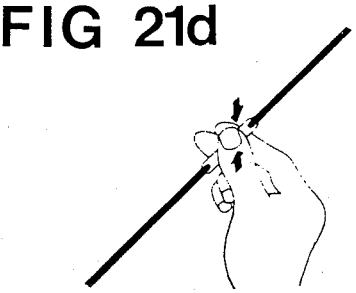

FIGS. 21A, 21B, 21C and 21D illustrate the one convenient method of mounting the marking devices on a wire. In this arrangement, the individual marking devices 60 are formed on a sheet 62 as in the embodiment of FIG. 18. As shown in FIG. 21A, an individual simply bends the sheet to align the holes of a single marker so that the wire may be passed easily therethrough as illustrated. In FIG. 21B, the worker simply pulls the wire from the sheet to sever the bridges 54 and then, as shown in FIG. 21C, the worker can easily slide the marker 60 along the wire 58 to any desired position. When in the proper position, the operator then squeezes the marking device against the wire as shown in FIG. 21D which will effect bending of the end lugs whereby the wire is wedged in the narrow portions of the pear-shaped openings, previously described.

Figure 22A:
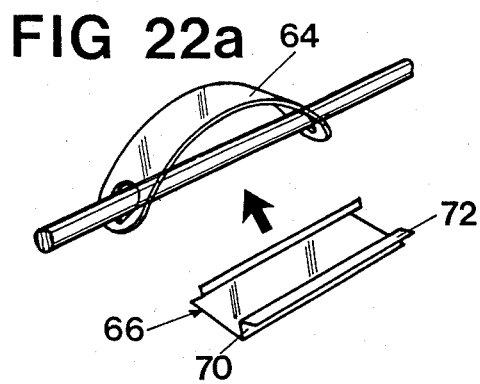
Figure 22B:
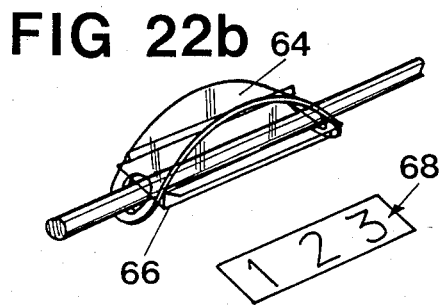
Figure 22C:
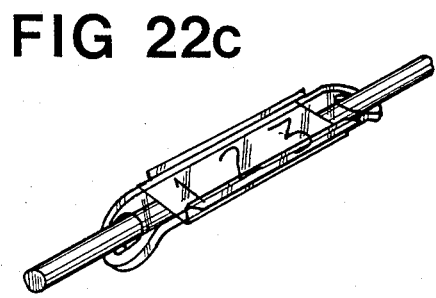

In FIGS. 22A-C as shown a marker 64 of the kind shown in FIGS. 18-21, but with no printed marking symbols and made from a transparent material. A holder 66 for a marking element 68 is provided, which comprises a flat oblong piece of material with upstanding slightly inwards directed longitudinal side gables 70. The side gables 70 are provided with outwards directed longitudinal flanges 72. The width of the holder 66 substantially corresponds to the width of the marker 64 and the length is somewhat less than the length of the intermediate portion of the marker between the holes, so that the holder 66 easily can be inserted under the marker when this is in arched position as is shown in FIG. 22B. A marking element 68 can now be inserted into the holder 66, which by snap action is locked to the marker 64, when this is pushed to its straightened out position as is shown ing FIG. 22C. Of course the holder 66 can carry marking symbols itself, which are directly imprinted thereon. These arrangements enable a quick exchange of marking symbols without having to remove the marker from the wire.

Figure 23:
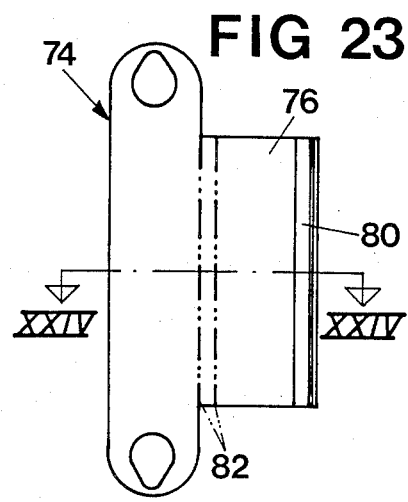
Figure 24:
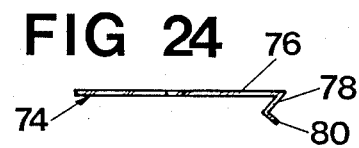
Figure 25:
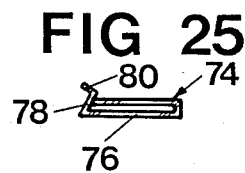

In FIGS. 23-25 is shown a marker 74, which as an integral unit has a holder 76 for a marking element (not shown) and which has an upstanding slightly inwards directed longitudinal side gable 78 with an outwards directed longitudinal flange 80. The width of the holder 76 between the side gable 78 and folding lines 82 substantially corresponds to the width of the marker 74, so that when the holder 76 is folded 180° along the folding lines 82 to the position shown in FIG. 25 it will by snap action be locked to the marker 74.

Figure 26:
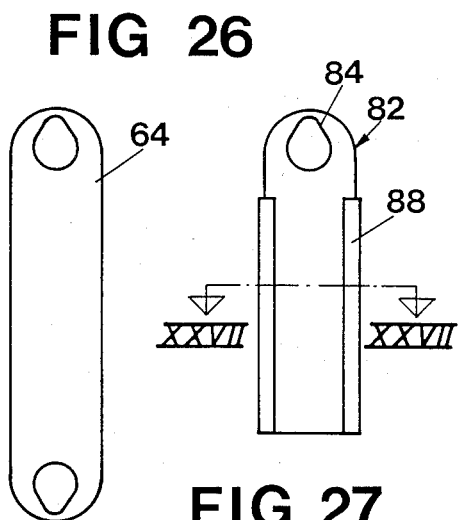
Figure 27:
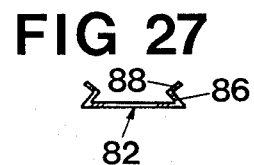

In FIGS. 26 and 27 is shown a further embodiment of a holder 82 for a marking element. It substantially corresponds to the holder shown in FIG. 22 and thus has longitudinal upstanding slightly inwards directed side gables 86 with outwards directed flanges 88. The holder 82 is further at one end provided with a lug corresponding to the lugs of the marker 64 and having a hole 84 therein. The marker 64 is of the same kind as the one shown in FIG. 22, i.e. of a transparent material. A marking element is placed in the holder 82, which is brought to a position just opposite and below the marker 64. A wire is passed through the holes of the marker and the holder and by pressing the holder and marker against the wire, the holder is by snap action locked to the marker and the marker is locked to the wire simultaneously.

The invention is not limited to the embodiments hereinbefore described, which may be modified within the scope of the appended claims.

What is claimed is:

1. A device for the marking of elongated objects such as electrical single wires or cables, tubes, pipes or the like and comprising a substantially flat oblong piece of material having an intermediate portion and end portions, said end portions being provided with openings and being capable of bending relative to said intermediate portion for moving said openings into substantially axial alignment, said intermediate portion being hollow and having open ends for receiving a marking element and said end portions, when bent, covering said open ends of said hollow intermediate portion.

2. A device as claimed in claim 1, wherein said end portions are provided with a number of slits extending radially outwardly from the circumference of said opening provided in each end portion.

3. A device as claimed in claim 1 and being in the form of a flat oblong piece of material of substantially uniform thickness, a series of such pieces being stamped out from a sheet of said flexible, slightly resilient material with the exception of easily breakable connecting bridges, said sheet of material being provided with printing constituting the marking on the marking devices.

* * * * *